United States Patent
Long et al.

(10) Patent No.: US 7,886,300 B1
(45) Date of Patent: Feb. 8, 2011

(54) MECHANISM FOR IMPLEMENTING THREAD SYNCHRONIZATION IN A PRIORITY-CORRECT, LOW-MEMORY SAFE MANNER

(75) Inventors: Dean R. E. Long, Boulder Creek, CA (US); Yin Zin Mark Lam, Milpitas, CA (US); Jiangli Zhou, San Jose, CA (US)

(73) Assignee: Oracle America, Inc. formerly known as Sun Microsystems, Inc., Redwood City, CA (US)

( * ) Notice: Subject to any disclaimer, the term of this patent is extended or adjusted under 35 U.S.C. 154(b) by 1170 days.

(21) Appl. No.: 11/528,188

(22) Filed: Sep. 26, 2006

(51) Int. Cl.
*G06F 9/46* (2006.01)
*G06F 12/00* (2006.01)
*G06F 13/28* (2006.01)

(52) U.S. Cl. .................. 718/104; 710/200; 711/152
(58) Field of Classification Search ............... 718/104; 710/200; 711/152
See application file for complete search history.

(56) References Cited

U.S. PATENT DOCUMENTS

| | | | |
|---|---|---|---|
| 6,134,627 A | 10/2000 | Bak | |
| 6,167,424 A | 12/2000 | Bak et al. | |
| 6,487,652 B1 | 11/2002 | Gomes et al. | |
| 6,510,437 B1 * | 1/2003 | Bak et al. | 707/783 |
| 6,691,304 B1 | 2/2004 | Zhang et al. | |
| 7,458,076 B2 * | 11/2008 | Swanberg et al. | 718/100 |
| 7,676,809 B2 * | 3/2010 | Vaidyanathan et al. | 718/103 |
| 2002/0178208 A1 * | 11/2002 | Hutchison et al. | 709/102 |

OTHER PUBLICATIONS

The definition of "storage media" by Microsoft Computer Dictionary, p. 499, Published May 1, 2002 (see attachment).*

* cited by examiner

*Primary Examiner*—Qing Wu
*Assistant Examiner*—Camquy Truong
(74) *Attorney, Agent, or Firm*—Osha • Liang LLP (57) ABSTRACT

A mechanism is disclosed for implementing fast locking in a multi-threaded system. This mechanism enables fast locking to be performed even on an operating system platform that does not allow one thread to assign ownership of a lock on a mutex to another thread. In addition, the mechanism performs locking in a manner that ensures priority correctness and is low-memory safe. In one implementation, the priority correctness is achieved by using operating system mutexes to implement locking, and the low-memory safe aspect is achieved by pre-allocating a memory section to each thread. This pre-allocated memory section ensures that a thread will have sufficient memory to obtain a lock, even when a system is in a low-memory state. With this mechanism, it is possible to implement locking in a safe and efficient manner.

20 Claims, 9 Drawing Sheets

BOOST RECORD

BOOST QUEUE

POINTER TO MUTEX

POINTER TO CANCEL OBJECT

Fig. 3

BOOST RECORD B2

BOOST QUEUE
- THREAD T2

POINTER TO MUTEX (M1)

POINTER TO CANCEL OBJECT (CO2)

Fig. 6

BOOST RECORD B2

BOOST QUEUE
- THREAD T2
- THREAD T3

POINTER TO MUTEX (M1)

POINTER TO CANCEL OBJECT (CO2)

MECHANISM FOR IMPLEMENTING THREAD SYNCHRONIZATION IN A PRIORITY-CORRECT, LOW-MEMORY SAFE MANNER

BACKGROUND

During the execution of Java applications, it is often necessary for a thread to obtain a lock (i.e. synchronize) on an object. By obtaining the lock, the thread ensures that, while it is operating on the object or a resource associated with the object, the object or the associated resource will not be modified by another thread. This helps to ensure data consistency and integrity.

Traditionally, a thread obtains a lock on an object by invoking a locking function of the Java virtual machine (JVM). In response to this invocation, the locking function (which is now being executed by the thread) creates a heavy-weight lock (HL) data structure, and associates the HL data structure with the object that is being locked. In addition, the locking function calls down to the operating system (OS) and requests an OS level locking structure (e.g. a mutex). After the mutex is obtained and associated with the HL data structure, the locking function calls down to the OS again to lock the mutex. Once that is done, the thread owns a lock on the mutex and no other thread will be allowed to lock the object until this thread releases the lock.

According to the above locking methodology, an HL data structure is created and a mutex is requested when an object is locked. The creation of a HL data structure and the setup of the mutex is relatively resource intensive. It has been observed that, in a majority of cases in which a lock is obtained on an object, no contention actually occurs. That is, a thread obtains the lock and releases the lock on the object before any other thread tries to obtain a lock on that object. Thus, in most cases, the HL data structure and the mutex are not used, and the locking overhead is incurred needlessly. In light of this observation, some JVM's have been enhanced to implement a fast locking methodology. According to this approach, a JVM does not necessarily create an HL data structure when an object is locked. Rather, the JVM creates a light-weight, fast lock (FL) data structure, which is much less resource intensive to create than the HL data structure. Only when there is actual contention will the JVM create the HL data structure and request a mutex. By doing so, the JVM reduces the amount of overhead that is incurred as a result of locking.

One approach that has been used to implement fast locking is as follows. When a first thread desires a lock on an object, it invokes the locking function of the JVM. In response to this invocation, the locking function (which is now being executed by the first thread), sees that this is the first request to lock the object; hence, it creates an FL data structure and associates it with the object. The locking function does not create an HL data structure, nor does it call down to the OS to obtain a mutex. If the first thread releases the lock on the object before any other thread tries to lock that same object, then the locking function simply frees the FL data structure (to be used by other threads), and the HL data structure is never created.

If, however, a second thread requests a lock on the object while the first thread has a lock on the object, then the locking function will create the HL data structure. Specifically, when the second thread invokes the locking function of the JVM, the locking function (which is now being executed by the second thread) sees the FL data structure that has already been created, and knows that the first thread has already locked the object. Thus, it knows that there is lock contention. In response, the locking function creates an HL data structure, and associates it with the object. Thereafter, the locking function calls down to the OS and requests a mutex. After the mutex is obtained and associated with the HL data structure, the locking function calls down to the OS again to lock the mutex. As part of this process, the locking function causes ownership of the lock on the mutex to be assigned to the first thread (note: even though it is the second thread that is requesting the lock on the mutex, the ownership of the lock is assigned to the first thread because that is the thread that should currently own the lock). Some operating systems allow this to be done. Once that is done, the first thread owns an actual lock on the object. Thereafter, the locking function calls down to the OS again and tries to lock on the mutex, this time on behalf of the second thread. Because the mutex is now locked by the first thread, the second thread cannot lock on the mutex. As a result, the OS puts the second thread to sleep (i.e. the second thread blocks and waits). The second thread will be awakened by the OS at some point when the lock on the mutex has been released. At that point, the second thread will be allowed to contend for and possibly obtain a lock on the mutex. In this manner, the JVM implements fast locking, and creates an HL data structure and requests a mutex only when there is actual lock contention.

In the above approach, the JVM relies upon the ability of an operating system to allow one thread to cause the lock on a mutex to be assigned to another thread. Unfortunately, many operating systems do not have this capability. For those operating systems, the above fast locking approach cannot be implemented.

SUMMARY

In accordance with one embodiment of the present invention, there is provided a mechanism for implementing fast locking in a multi-threaded system. With this mechanism, it is possible to implement fast locking even on an operating system platform that does not allow one thread to assign ownership of a lock on a mutex to another thread. In addition, the mechanism performs locking in a manner that ensures priority correctness and low-memory safety. In one embodiment, the priority correctness is achieved by using operating system mutexes to implement locking, and the low-memory safety is achieved by pre-allocating a memory section for each thread. This pre-allocated memory section ensures that a thread will always have sufficient memory to implement a "thread boosting" part of a locking process, even when a system is in a low-memory state. With this mechanism, it is possible to implement fast locking on more operating system platforms, and in a safe and efficient manner.

DETAILED DESCRIPTION OF EMBODIMENT(S)

Conceptual Overview

In accordance with one embodiment of the present invention, there is provided a mechanism for enabling fast locking to be performed in a multi-threaded system, such as a Java-based system. This mechanism enables fast locking to be performed even on an operating system platform that does not allow one thread to assign ownership of a lock on a mutex to another thread. In addition to enabling fast locking to be performed on more operating system platforms, this mechanism also addresses at least two other significant concerns.

One concern is that of priority correctness. To elaborate, many multi-threaded systems allow different priorities to be assigned to different threads. For example, a first thread may be assigned a lower priority than a second thread. With different priorities, threads may be allowed to access resources in different orders. For example, when contending for a resource, the second thread (with the higher priority) may be allowed to access the resource before the first thread. Priority differences should be taken into account when managing locks. If they are not, then some undesirable results, including resource starvation, may occur.

To ensure priority correctness with regard to locking, "thread boosting" is implemented. Thread boosting refers to the process of temporarily boosting the priority of a thread when a thread with a higher priority is waiting for a lock held by that thread. For example, suppose that the first thread has a lock on an object. Suppose further that the second thread (with a higher priority) tries at a later time to get a lock on that same object. Because the first thread already has a lock on the object, the second thread has to wait for the lock. To enable the second thread to get the lock as soon as possible, the priority of the first thread is temporarily boosted to the priority level of the second thread. Doing so enables the first thread to operate at an elevated priority level, which in turn, enables the first thread to complete its tasks sooner and to relinquish the lock sooner. Thread boosting is automatically implemented by some operating systems if a certain type of OS locking structure (e.g. a mutex) is used. That being the case, one embodiment of the present invention uses OS mutexes to implement locking to ensure that the underlying operating system will implement thread boosting (also referred to herein as priority inheritance) to achieve priority correctness.

Another concern that is addressed by an embodiment of the present invention is that of proper operation in a low-memory environment. In many operational situations, a computing device may have very little free memory available. This circumstance may arise frequently in small portable devices, which have very little memory in the first place. Despite having very little free memory, a thread will still need to obtain locks on resources. For example, when a thread shuts down, it needs to obtain locks in order to do the shutdown properly. If the thread cannot obtain the locks, it will not shut down properly, and may cause the system to crash inexplicably. One of the conditions that may cause a thread to not be able to obtain a lock is lack of free memory. More specifically, in order to obtain a lock, a section of memory is needed. If the memory is allocated at the time the lock is needed, and if there is insufficient free memory at that time, then the thread will not be able to obtain the lock, which in turn, may cause the system to crash. To prevent this scenario from arising, one embodiment of the present invention pre-allocates a section of memory (referred to herein as a boost record) for each thread. This memory section is allocated at the time the thread is started. By pre-allocating the memory section, it is guaranteed that a thread will always have sufficient memory to implement the thread boosting part of locking, even when the system is in a low-memory state. Thus, the locking methodology disclosed herein is low-memory safe.

System Overview

Figure 1:
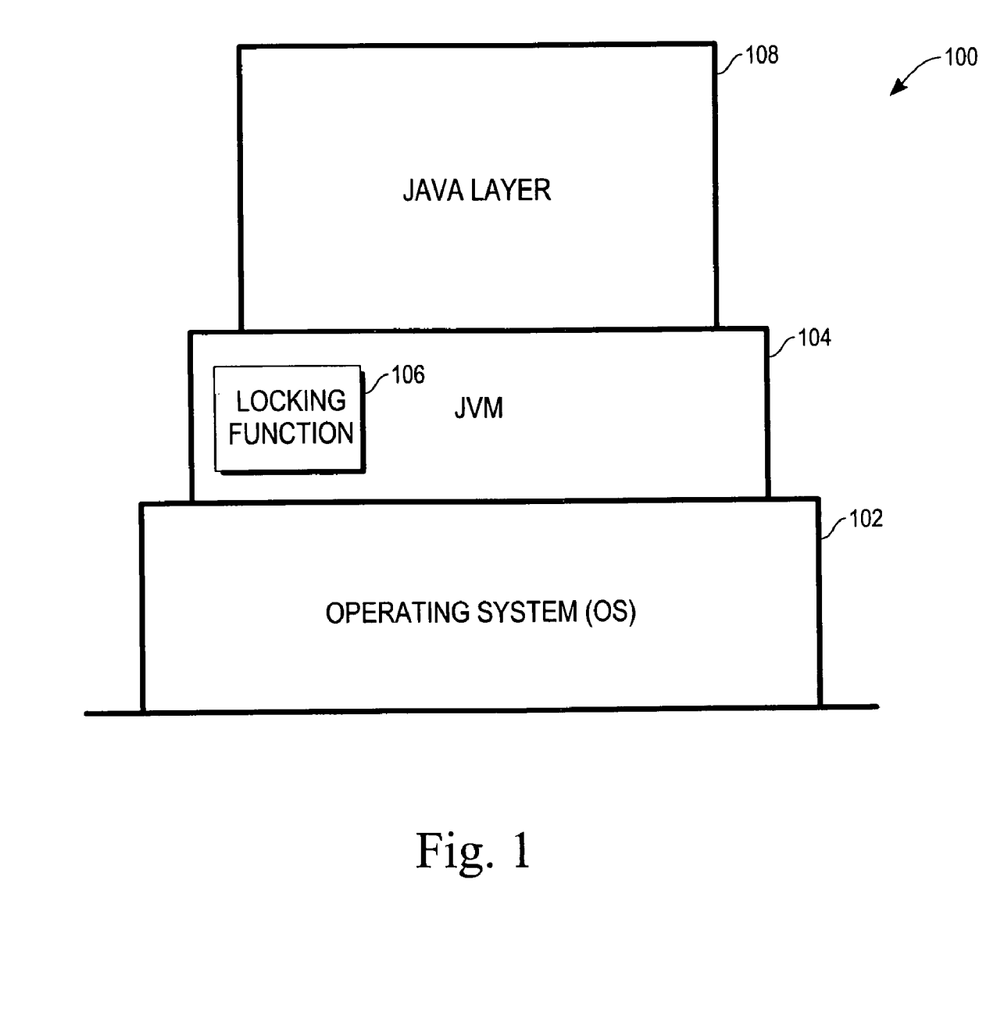
FIG. 1 is a functional block diagram of a system in which one embodiment of the present invention may be implemented.

With reference to FIG. 1, there is shown a functional block diagram of a system 100 in which one embodiment of the present invention may be implemented. In the following discussion, it will be assumed for the sake of illustration that the system 100 is a Java-based system. However, it should be noted that the concepts taught herein are not so limited but rather may be applied to any other type of multi-threaded system in which locking is to be implemented. For purposes of the present invention, the functional components of FIG. 1 may be implemented on any type of computer system, including but not limited to, desktop computers, servers, portable computers (e.g. notebook or laptop computers, personal digital assistants (PDA's), etc.), and other computing devices (e.g. mobile phones).

As shown, system 100 comprises an operating system (OS) 102, a Java virtual machine (JVM) 104, and a Java layer 108. The OS 102 provides all of the underlying, low level functionalities that are relied upon by all of the other components in the system 100. These functionalities include, but are certainly not limited to, managing locks, putting threads to sleep (i.e. causing threads to block and wait), waking threads, implementing priority inheritance, etc. For purposes of the present invention, OS 102 may be any operating system, including but not limited to Solaris, Unix, Linux, Windows, DOS, MacOS, etc.

The JVM 102 executes on top of the OS 102 and provides a platform for supporting execution of Java applications in the Java layer 108. In providing the platform, the JVM 104 provides many functionalities that are relied upon by the Java applications. One of these functionalities is a locking function 106. As will explained further in a later section, in one embodiment, it is the locking function 106 that implements, at least in part, the fast locking methodology disclosed herein. For the sake of simplicity, the locking function 106 is shown as a single block. In practice, the locking function 106 may comprises a plurality of components, including but not limited to, a locking function, an unlocking function, a locking/unlocking subsystem, a plurality of library modules, etc.

The Java applications (not shown) in the Java layer 108 execute on top of the JVM 104. When executing, these applications may create one or more objects. The applications may also be executed by one or more threads, which are managed by the JVM 104 and the OS 102. During operation, the threads may need to obtain locks on the objects. When that need arises, the threads executing the application code invoke the locking function 106 of the JVM 104. In response, the locking function 106 (which is executed by the invoking thread) implements the fast locking methodology of the present invention. To describe an embodiment of that methodology in detail, reference will now be made to an operating example.

Sample Operation

Thread Initialization

Suppose for the sake of example that during operation, a thread T1 (FIG. 2) is started. In one embodiment, when a thread is started, a number of operations are performed to initialize the thread. In the current example, a thread data structure 202(1) is initially created for T1. This data structure 202(1) is used to store information pertaining to T1. In addition to creating the thread data structure 202(1), an operating system level mutex M1 is also allocated. This mutex M1 is locked by thread T1; thus, from the very outset, thread T1 owns the lock on mutex M1. In one embodiment, thread T1 never releases the lock on mutex M1. The significance and use of this mutex M1 will be elaborated upon in a later section. Once the mutex M1 is allocated and locked, a pointer to the mutex M1 is stored in the thread data structure 202(1) for T1.

Figure 2:
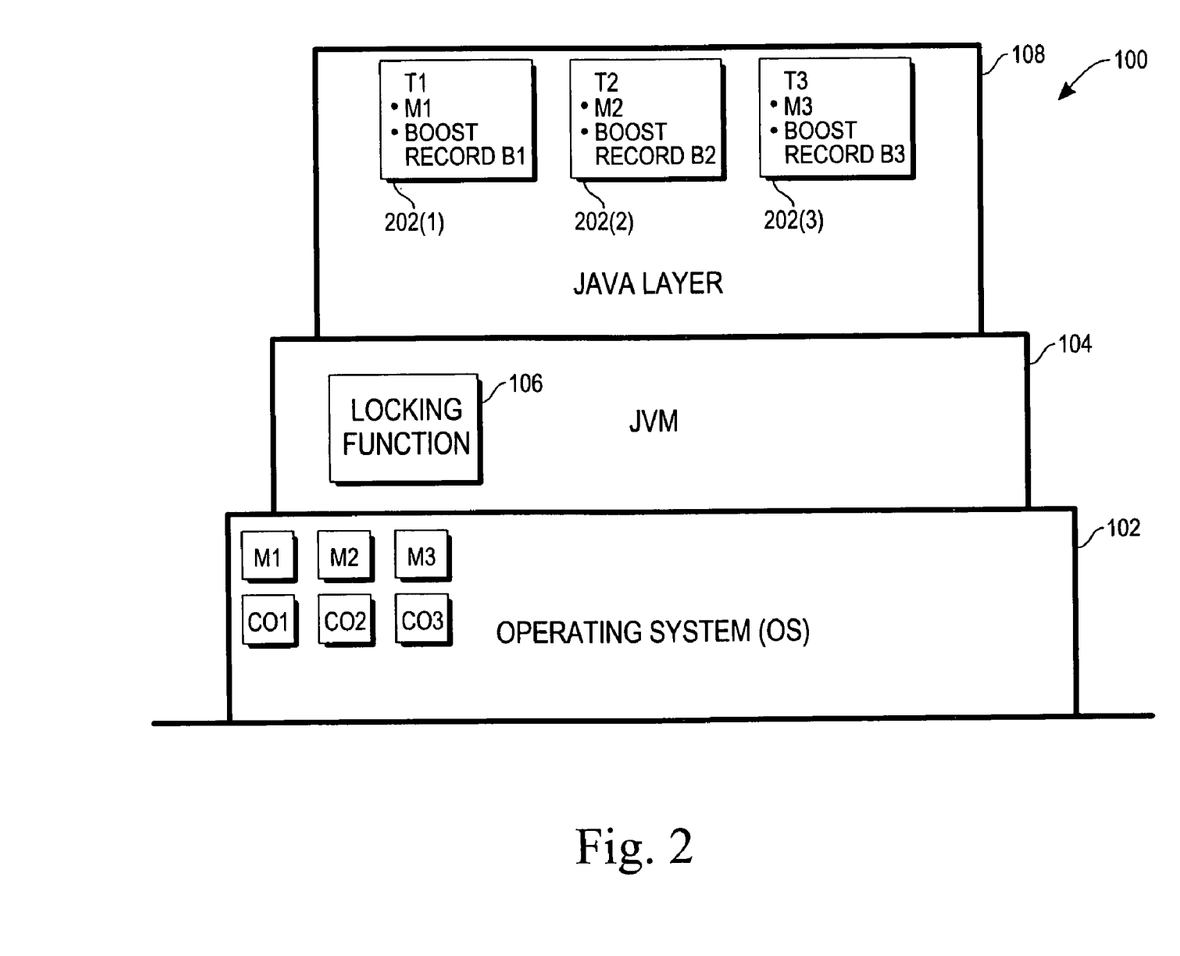
FIG. 2 shows the system of FIG. 1 after several threads have been initialized, in accordance with one embodiment of the present invention.

In addition to the above operations, an operating system level cancel object CO1 is also allocated for thread T1. For purposes of the present invention, this cancel object CO1 may be any type of object on which one or more threads can wait. In one embodiment, CO1 takes the form of a semaphore; however, it should be noted that other types of operating system level object may also be used, if so desired. In one embodiment, the cancel object CO1 has at least two methods that can be invoked: (1) wait; and (2) signal. The wait method is invoked to cause a thread to wait on the cancel object CO1. The signal method is invoked when it is desired to signal, and hence, wake the threads that are waiting on the cancel object C01. The significance and use of this cancel object CO1 will be elaborated upon in a later section.

Figure 3:
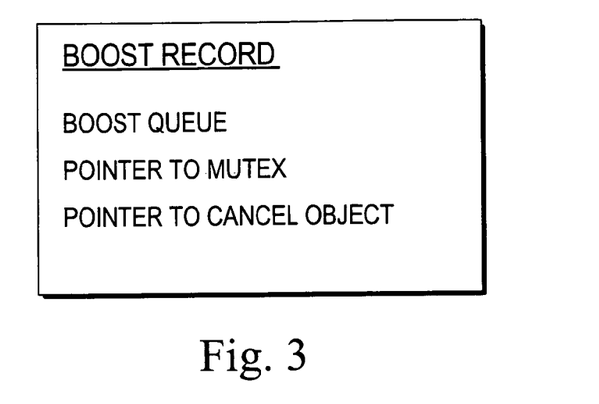
FIG. 3 shows the contents of a boost record, in accordance with one embodiment of the present invention.

As yet a further part of the thread initialization process, a section of memory (referred to as a boost record) is also allocated for thread T1. In one embodiment, this boost record B1 is used to facilitate locking, even in a low-memory state. A sample boost record in accordance with one embodiment of the present invention is shown in FIG. 3. As shown, a boost record may comprise a boost queue (which is initially empty), a pointer to a mutex (which is initially null), and a pointer to a cancel object. In one embodiment, the pointer to the cancel object points to the cancel object that has been allocated for that thread. In the case of thread T1, the pointer points to cancel object CO1. After the boost record B1 is allocated and populated, a pointer to the boost record B1 is stored in the thread data structure 202(1) for T1. The significance and use of the boost record B1 will be elaborated upon in a later section. After thread T1 is properly initialized, it is ready to be used to execute Java application code.

Suppose now that during operation, threads T2 and T3 are also started. When started, these threads are initialized in the same manner as that described above for thread T1. Specifically, when thread T2 starts: (1) a thread data structure 202(2) is created for T2; (2) an operating system level mutex M2 is allocated; (3) a lock on mutex M2 is obtained by thread T2, and in one embodiment, that lock is never released by T2; (4) a pointer to mutex M2 is stored in the thread data structure 202(2) for T2; (5) an operating system level cancel object CO2 is allocated; (6) a section of memory (boost record B2) is allocated for thread T2; (7) the boost record B2 is populated such that the pointer to the cancel object in the boost record is initialized to point to CO2; and (8) a pointer to the boost record B2 is stored in the thread data structure 202(2) for T2.

Similarly, when thread T3 starts: (1) a thread data structure 202(3) is created for T3; (2) an operating system level mutex M3 is allocated; (3) a lock on mutex M3 is obtained by thread T3, and in one embodiment, that lock is never released by T3; (4) a pointer to mutex M3 is stored in the thread data structure 202(3) for T3; (5) an operating system level cancel object CO3 is allocated; (6) a section of memory (boost record B3) is allocated for thread T3; (7) the boost record B3 is populated such that the pointer to the cancel object in the boost record is initialized to point to CO3; and (8) a pointer to the boost record B3 is stored in the thread data structure 202(3) for T3. After the threads T1-T3 are properly initialized, they are ready to be used to execute Java application code.

Initial Fast Lock

Suppose that in the course of executing Java application code, a java object 402 (FIG. 4) is instantiated. Suppose further that thread T1, while executing a set of Java application code, wishes to obtain a lock on the object 402, for example, in order to access or update the object 402. To do so, thread T1 invokes, and hence, starts executing the locking function 106 of the JVM 104. In response, the locking function 106 (now being executed by T1) determines whether the object 402 is currently locked. In the current example, the object 402 is not locked. Thus, the locking function 106 creates a light-weight fast lock (FL) data structure 404, associates the FL data structure 404 with the object 402, and updates the FL data structure 404 to indicate that T1 currently owns the lock on the object 402. Once that is done, T1 owns a fast lock on the object 402. Thereafter, the locking function 106 notifies T1 that it has a lock on the object 402, and returns control to the Java application code that T1 was executing. Notice that at this point, no heavy-weight lock (HL) data structure is created, and no operating system level mutex is used to implement the lock. If T1 invokes the locking function 106 again to release the lock before any other thread tries to lock the object 402, the locking function 106 will simply release the fast lock on the object 402, and no HL data structure will be created.

Boost Condition

Figure 4:
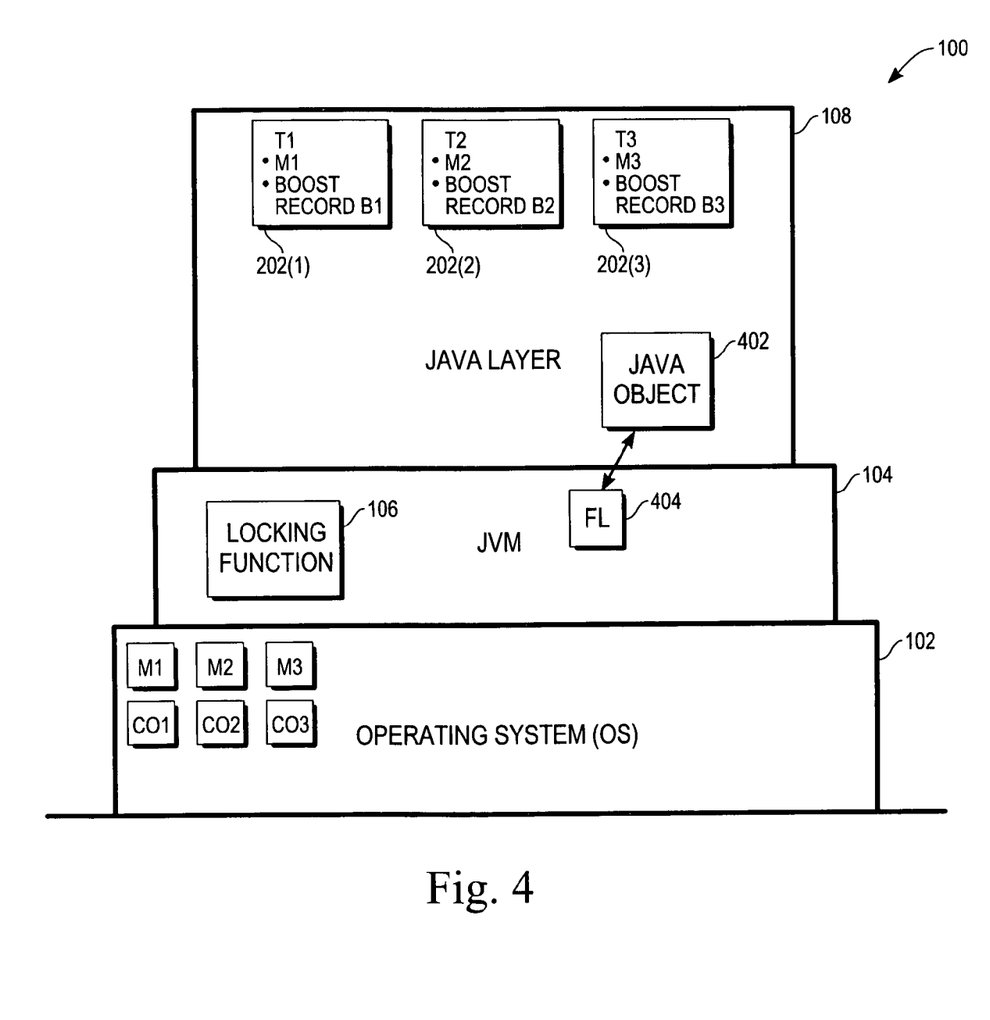
FIG. 4 shows the system of FIG. 2 after a fast lock on an object has been granted to a thread, in accordance with one embodiment of the present invention.

However, suppose that while T1 owns the fast lock on the object 402, thread T2 invokes, and hence, executes the locking function 106 of the JVM 104 to try to obtain a lock on object 402. In response, the locking function 106 (now being executed by T2) determines whether the object 402 is currently locked. From the FL data structure 404, the locking function 106 determines that there is currently a fast lock on the object 402. The locking function 106 also sees from the FL data structure 404 that it is thread T1, not thread T2, that currently owns the fast lock. From the absence of an HL data structure, the locking function 106 also determines that there is currently no heavy-weight lock on the object 402. Since there is now lock contention, and since there is no existing heavy-weight lock, the locking function 106 proceeds to inflate the fast lock. As used herein, the term "inflation" refers to the process of converting a fast lock into an operating system level heavy-weight lock.

Figure 5:
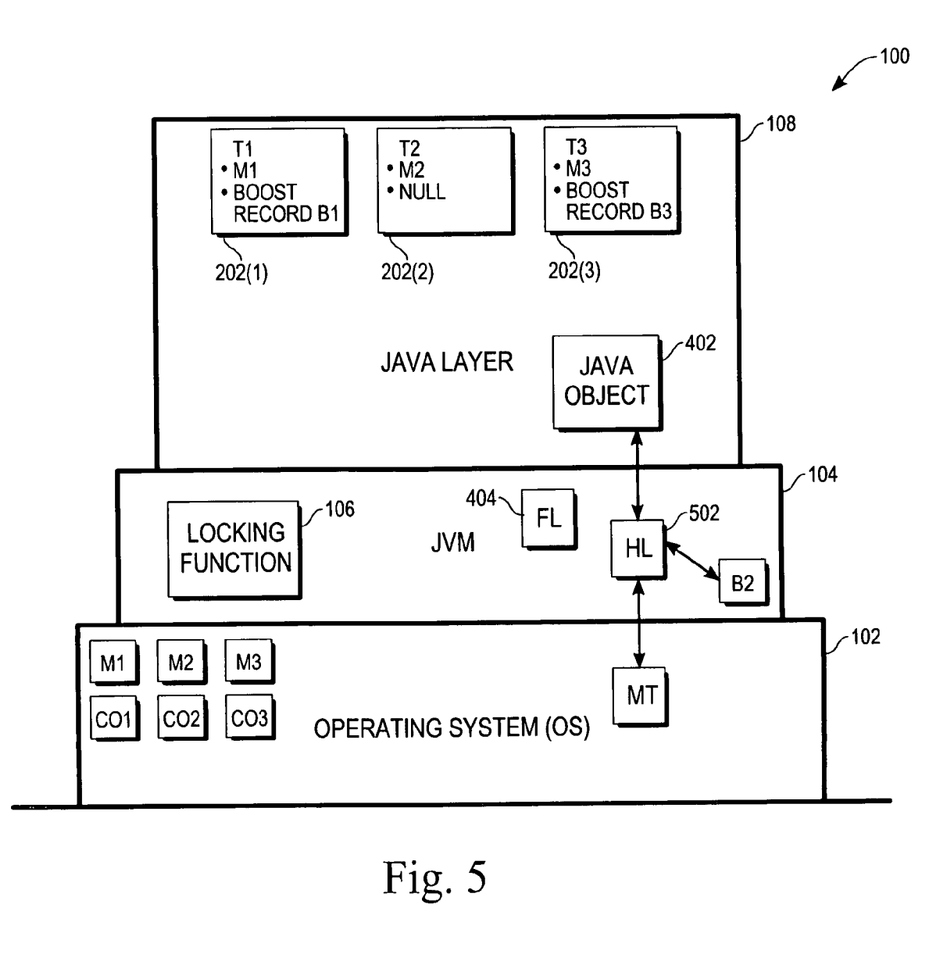
FIG. 5 shows the system of FIG. 4, after the fast lock has been partially inflated, in accordance with one embodiment of the present invention.

In one embodiment, inflation begins with creating an HL data structure 502 (FIG. 5). Once the HL data structure 502 is created, the locking function 106 disassociates the FL data structure 404 from the object 402 (the FL data structure 404 may be deallocated or moved to a free list at this point), associates the HL data structure 502 with the object 402, and updates the HL data structure 502 to indicate that thread T1 (not thread T2) currently owns the lock. After the HL data structure 502 is updated, the locking function 106 continues the inflation process by calling down to the OS 102 to have a target mutex MT allocated. Once allocated, this mutex MT is associated with the HL data structure 502. To complete the inflation process, it would be desirable to obtain a lock on the target mutex MT and to have that lock owned by thread T1 (since T1 is the thread that currently owns the lock on the object 402). However, recall that the locking function 106 is currently being executed by T2. If the locking function 106 calls down to the OS 102 to obtain a lock on the mutex MT, it will be thread T2, not thread T1, that owns the lock on the mutex MT (it is assumed in this example that the OS 102 does not have the ability to allow a thread to assign a lock on a mutex to another thread). Since having thread T2 own the lock is not the desired result, the inflation process cannot be completed at this time. Instead, in one embodiment, the locking function 106 puts the lock into a "boost" condition. A boost condition is an intermediate condition in which a lock is more than just a fast lock but is not quite yet a completed operating system level heavy-weight lock. In one embodiment, to put the lock into a boost condition, the locking function 106 performs the following operations.

Initially, the locking function 106 determines that it is currently being executed by thread T2. Thus, it uses the boost record B2 associated with thread T2 to implement the boost condition. Specifically, in one embodiment, the locking function 106 updates a boost record pointer in the HL data structure 502 to point to boost record B2 (this association is shown by the arrowed line between HL data structure 502 and boost record B2 in FIG. 5). In addition, the locking function 106 changes the boost record pointer in the thread data structure 202(2) for T2 to "null" so that the pointer no longer points to boost record B2. By doing so, the locking function 106 disassociates the boost record B2 from thread T2 and associates the boost record B2 with the HL data structure 502. In effect, thread T2 "donates" its boost record B2 to enable the boost condition to be implemented. Notice that by using a pre-allocated, donated boost record to implement the boost condition, it is guaranteed that a thread will always have the memory that it needs to implement the boost condition. Thus, this methodology can be implemented even when a system is in a low-memory state. In one embodiment, as an additional step, the locking function 106 sets a boost condition flag in the HL data structure 502 to indicate that the lock is now in a boost condition.

Figure 6:
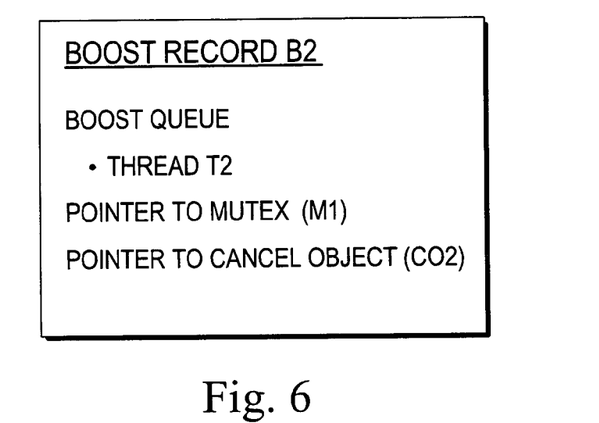
FIGS. 6 and 7 show the contents of a sample boost record after one or more threads have been added to the boost queue, in accordance with one embodiment of the present invention.

After the boost record B2 is donated, the locking function 106 updates the boost record B2 as shown in FIG. 6. Specifically, thread T2 is added to the boost queue. This indicates that thread T2 is now one of the threads waiting for the lock on object 402. In addition, the pointer to the mutex is updated to point to mutex M1. This mutex pointer is used to point to a locked mutex that is owned by the thread that currently owns the lock on the object 402. In the current example, thread T1 currently owns the lock on the object 402, and mutex M1 is the mutex that is locked and owned by thread T1. Notice that the pointer to the mutex is not updated to point to the target mutex MT because the target mutex MT is not currently locked and owned by any thread. In one embodiment, to obtain the pointer to mutex M1, the locking function 106 determines, from the HL data structure 502, that thread T1 currently owns the lock on the object 402. The locking function 106 then accesses the thread data structure 202(1) associated with thread T1 and obtains the pointer to mutex M1 therefrom. Once obtained, the pointer to mutex M1 is used to update the pointer to the mutex in boost record B2. Once that is done, the boost record B2 is fully updated (the pointer to the cancel object already points to CO2; thus, it does not need to be updated).

After the boost record B2 is updated, the locking function 106 calls down to the OS 102 to cause thread T2 to be put to sleep (i.e. to cause thread T2 to wait for the lock on object 402). In one embodiment, the locking function 106 does this by causing thread T2 to wait on both the mutex M1 and the cancel object CO2. More specifically, in one embodiment, the locking function 106 calls down to the OS 102 and informs the OS 102 that thread T2 will block and wait on M1 and CO2. With this "multi-wait" request, the locking function 106 is telling the OS 102 to put thread T2 to sleep (i.e. to cause T2 to block and wait) and to awaken thread T2 if either the lock on mutex M1 is released or the cancel object CO2 is signaled. Recall from previous discussion that, in one embodiment, the lock on mutex M1 is never released by thread T1; thus, the only way to wake thread T2 is by signaling the cancel object CO2. This would make it appear that waiting on mutex M1 is superfluous. It is not, however, because by waiting on mutex M1, thread T2 causes the OS 102 to implement priority inheritance (so that if thread T2 has a higher priority than thread T1, the priority of thread T1 is temporarily boosted to the priority of thread T2). This in turn ensures priority correctness. Put another way, if thread T2 waited on just the cancel object CO2 (which is not a mutex owned by thread T1), the OS 102 would not implement priority inheritance, and hence, would not ensure priority correctness. Thus, by having thread T2 wait on mutex M1 as well as cancel object CO2, the locking function 106 causes the OS 102 to enforce priority correctness.

Figure 7:
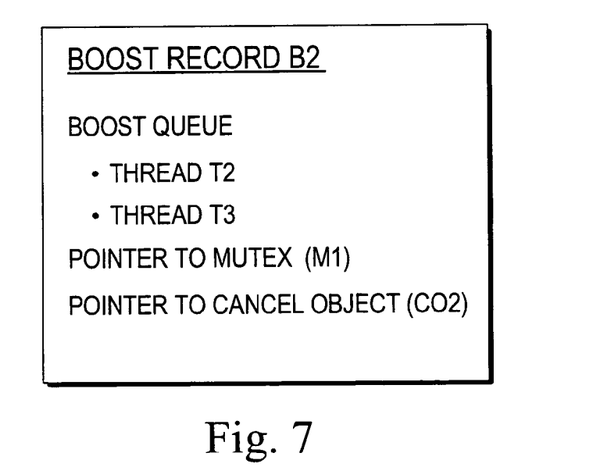

Suppose now that after thread T2 is put to sleep, thread T3 invokes, and hence, executes the locking function 106 of the JVM 104 to try to obtain a lock on object 402. In response, the locking function 106 (now being executed by T3) determines whether the object 402 is currently locked. From the HL data structure 502, the locking function 106 determines that the object 402 is currently locked, and that the lock is owned not by T3 but by T1. Also, from the boost condition flag in the HL data structure 502, the locking function 106 knows that the lock is currently in a boost condition. Thus, the locking function 106 knows that the lock has not been fully inflated, and hence, the target mutex MT cannot be used for locking purposes. Having made these determinations, the locking function 106 adds thread T3 to the boost queue in the boost record B2 (see FIG. 7). Doing so indicates that thread T3 is another thread that is waiting for a lock on object 402. Thereafter, the locking function 106 calls down to the OS 102 to cause thread T3 to be put to sleep (i.e. to cause thread T3 to wait for the lock on object 402). In one embodiment, this is done in the same manner as that described above for thread T2. Namely, the locking function 106 calls down to the OS 102 and informs the OS 102 that thread T3 will wait on M1 and CO2 (T3 obtains the pointers to M1 and CO2 from the boost record B2). If either the lock on mutex M1 is released or the cancel object CO2 is signaled, thread T3 is to be awakened. Again, by waiting on mutex M1, thread T3 causes the OS 102 to implement priority inheritance (so that if thread T2 or T3 has a higher priority than thread T1, the priority of thread T1 is temporarily boosted to the highest priority of threads T2 and T3). Thus, priority correctness is assured.

Boost Canceling and Subsequent Locking

In the manner described above, the lock on object 402 is granted to thread T1, and threads T2 and T3 are put to sleep to wait for the lock to be released. Suppose now that thread T1, after having completed execution of the Java application code that requires locking of the object 402, decides to release the lock. To do so, thread T1 invokes, and hence, executes the locking function 106 of the JVM 104 to release the lock on object 402. In response, the locking function 106 (which is now being executed by thread T1), examines the locking data structures that have been created thus far. From the presence of the HL data structure 502, the locking function 106 knows that more than just a fast lock has been created. Also from the HL data structure 502, the locking function 106 knows that T1 (the thread that is executing the locking function 106) currently owns the lock on the object 402. Furthermore, from the boost condition flag in the HL data structure 502, the locking function 106 knows that the lock is currently in a boost condition; thus, it knows that the inflation process has not yet been completed. That being the case, the locking function 106 calls down to the OS 102 to obtain a lock on the target mutex MT. Once T1 obtains the lock on mutex MT, the inflation process is completed. Once the inflation process is completed, the boost condition can be canceled.

To do so, the locking function 106 updates the boost condition flag in the HL data structure 502 to reset it. With the boost condition canceled, the locking data structures look the same as if thread T1 had initially created a heavy-weight lock for the object 402 (namely, the object 402 has an HL data structure 502 associated therewith, which references a target mutex MT, which is locked by thread T1). Thereafter, the locking function 106 calls down to the OS 102 to signal the cancel object CO2 to awaken the threads that are currently waiting for a lock on the object 402 (the locking function 106 obtains the pointer to the cancel object CO2 from the boost record B2). In addition, the locking function 106 releases the lock on the target mutex MT. Once that is done, the waiting threads can contend for the lock on the target mutex MT. Thereafter, thread T1 returns from the locking function 106 and resumes executing Java application code.

In one embodiment, when the cancel object CO2 is signaled, all of the threads waiting on the cancel object CO2 are awakened. Thus, in the current example, both threads T2 and T3 are awakened by the OS 102. The order in which the threads are awakened is determined by the OS 102, and may be the same or different from the order in which they were put to sleep. When awakened, each thread resumes execution of the locking function 106, and the locking function 106 causes each of the threads to perform the following operations. Initially, when a thread awakes, it checks the status of the boost condition flag in the HL data structure 502. Seeing that the boost condition flag is no longer set, it knows that the boost condition has been canceled; thus, the thread proceeds to complete the cancellation process. In one embodiment, this includes removing the thread from the boost queue, and reclaiming a boost record (if necessary). Once that is done, the thread can contend for a lock on the target mutex. To illustrate in detail how these operations may be carried out, reference will be made to an example.

Suppose that thread T2 is the thread that is awakened first by the OS 102. When thread T2 awakes, it continues executing the locking function 106. Under control of the locking function 106, thread T2 checks the status of the boost condition flag in the HL data structure 502. In the current example, this flag has been reset; thus, thread T2 knows that the boost condition has been canceled. That being the case, thread T2 proceeds to complete the cancellation process. To do so, thread T2 updates the boost record B2 by removing thread T2 from the boost queue. This is done to indicate that thread T2 is no longer waiting for a lock on the object 402. In addition, thread T2 also checks to see if it has donated its boost record. If it has, then either the donated boost record will be reclaimed or another boost record will be taken from another thread to take its place. In one embodiment, to determine whether it has donated its boost record, thread T2 inspects its thread data structure 202(2) to determine whether the thread data structure 202(2) contains a pointer to a boost record. If it does, then thread T2 has not donated its boost record. On the other hand, if the thread data structure 202(2) does not contain a pointer to a boost record (i.e. the boost record pointer has a value of "null"), then thread T2 has donated its boost record. In the current example, the boost record pointer in thread data structure 202(2) has a value of "null"; thus, thread T2 has donated its boost record. In such a case, thread T2 proceeds to obtain a boost record.

Figure 8:
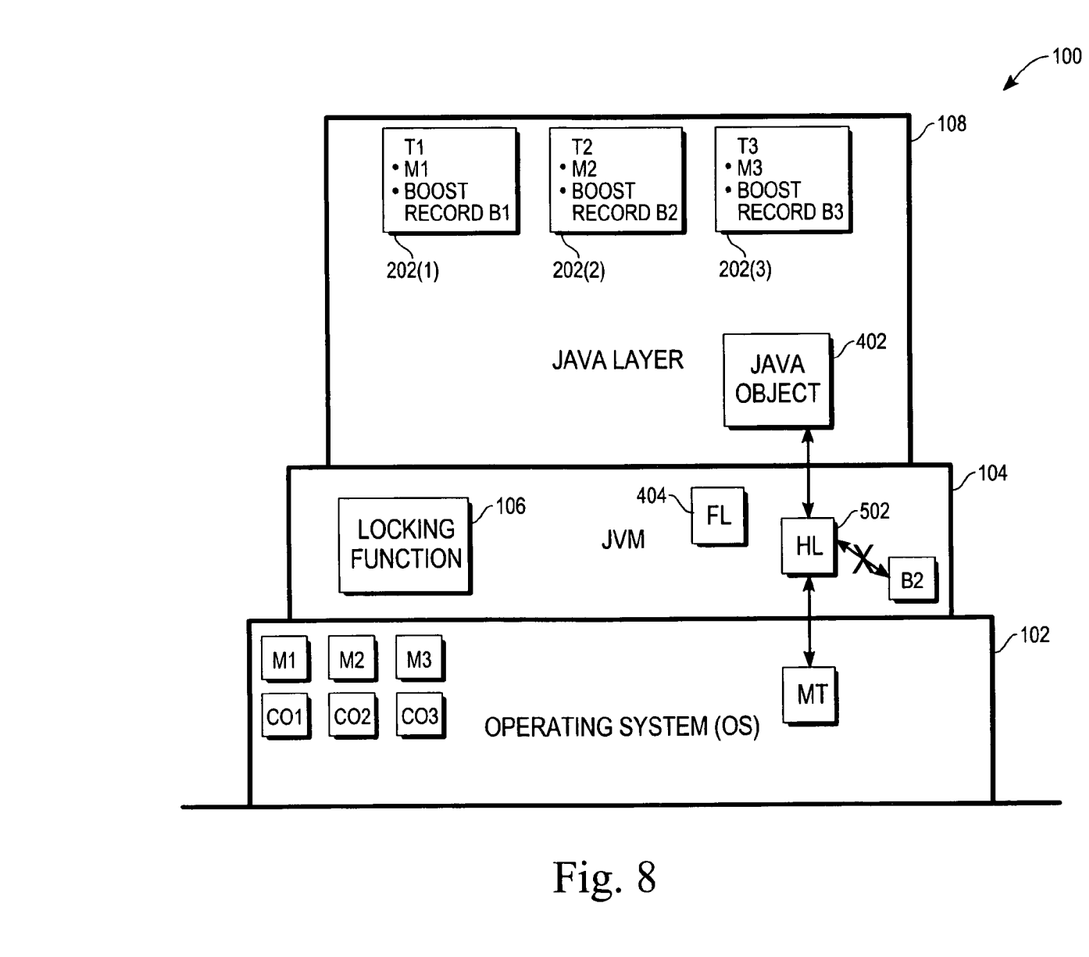
FIGS. 8-10 show the system of claim 5 in various scenarios after a boost record has been stolen or reclaimed, in accordance with one embodiment of the present invention.

To do so, thread T2 inspects the boost queue in the boost record B2 to determine whether the boost queue still comprises any threads. If it does not, then it means that no other threads will be referring to the boost record B2. In such a case, the boost record B2 can be reclaimed. In one embodiment, to reclaim the boost record, thread T2 would update the HL data structure 502 to remove the pointer to the boost record B2. In addition, thread T2 would update the boost record pointer in its thread data structure 202(2) to point to boost record B2. By doing so, thread T2 would disassociate the boost record B2 from the HL data structure 502 and associate the boost record B2 with itself. In this manner, the boost record B2 would be reclaimed by thread T2. This result is shown in FIG. 8.

Figure 9:
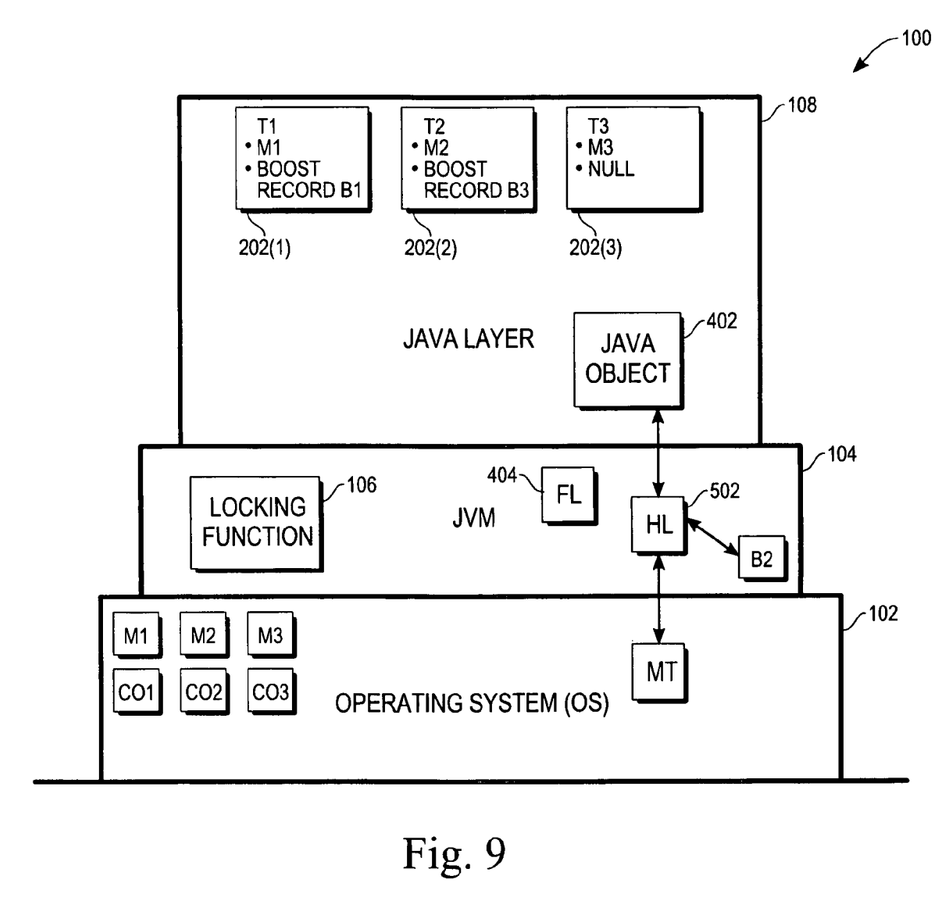

On the other hand, if the boost queue in the boost record B2 is not empty but rather still contains at least one thread, then it means that the remaining thread(s) may still need to refer to the boost record B2; hence, the boost record B2 cannot be reclaimed yet. This is the case in the current example because the boost queue still contains thread T3 (recall that thread T2 was removed from the boost queue previously). In such a case, a boost record will be taken from another thread. In one embodiment, to take a boost record from another thread, thread T2 selects one of the threads remaining in the boost queue. In the current example, thread T3 is the only remaining thread in the boost queue; thus, thread T2 selects thread T3. Thread T2 then accesses the thread data structure 202(3) (see FIG. 5) for thread T3 and obtains therefrom the pointer to thread T3's boost record B3. Thread T2 thereafter sets the boost record pointer in T3's thread data structure 202(3) to "null" and sets the boost record pointer in T2's thread data structure 202(2) to point to boost record B3 (see FIG. 9). By doing so, thread T2 disassociates boost record B3 from thread T3 and associates the boost record B3 with itself. In effect, thread T2 "steals" thread T3's boost record B3. After that is done, the boost cancellation process is completed (at least with respect to thread T2). Thereafter, thread T2 proceeds to contend for a lock on the target mutex MT. To do so, thread T2 calls down to the OS 102, and requests a lock on MT. In the current example, it will be assumed that thread T2 is granted a lock on mutex MT. Once it has the lock, thread T2 stops executing the locking function 106 and returns to executing Java application code.

Suppose that thread T3 is awakened after thread T2 obtains a lock on mutex MT. When thread T3 awakes, it continues executing the locking function 106. Under control of the locking function 106, thread T3 checks the status of the boost condition flag in the HL data structure 502. In the current example, this flag has been reset; thus, thread T3 knows that the boost condition has been canceled. That being the case, thread T3 proceeds to complete the cancellation process. To do so, thread T3 updates the boost record B2 by removing thread T3 from the boost queue. This is done to indicate that thread T3 is no longer waiting for a lock on the object 402. In addition, thread T3 also checks to see if it has donated its boost record. If it has, then either the donated boost record will be reclaimed or another boost record will be taken from another thread to take its place. As described above, to determine whether it has donated its boost record, thread T3 inspects its thread data structure 202(3) to determine whether the thread data structure 202(3) contains a pointer to a boost record. If it does, then thread T3 has not donated its boost record. On the other hand, if the thread data structure 202(3) does not contain a pointer to a boost record, then thread T3 has donated its boost record. In the current example, the boost record pointer in thread data structure 202(3) has a value of "null"; thus, thread T3 has donated its boost record (actually, the boost record was stolen by thread T2; thus, the donation was an involuntary one). In such a case, thread T3 proceeds to obtain a boost record.

Figure 10:
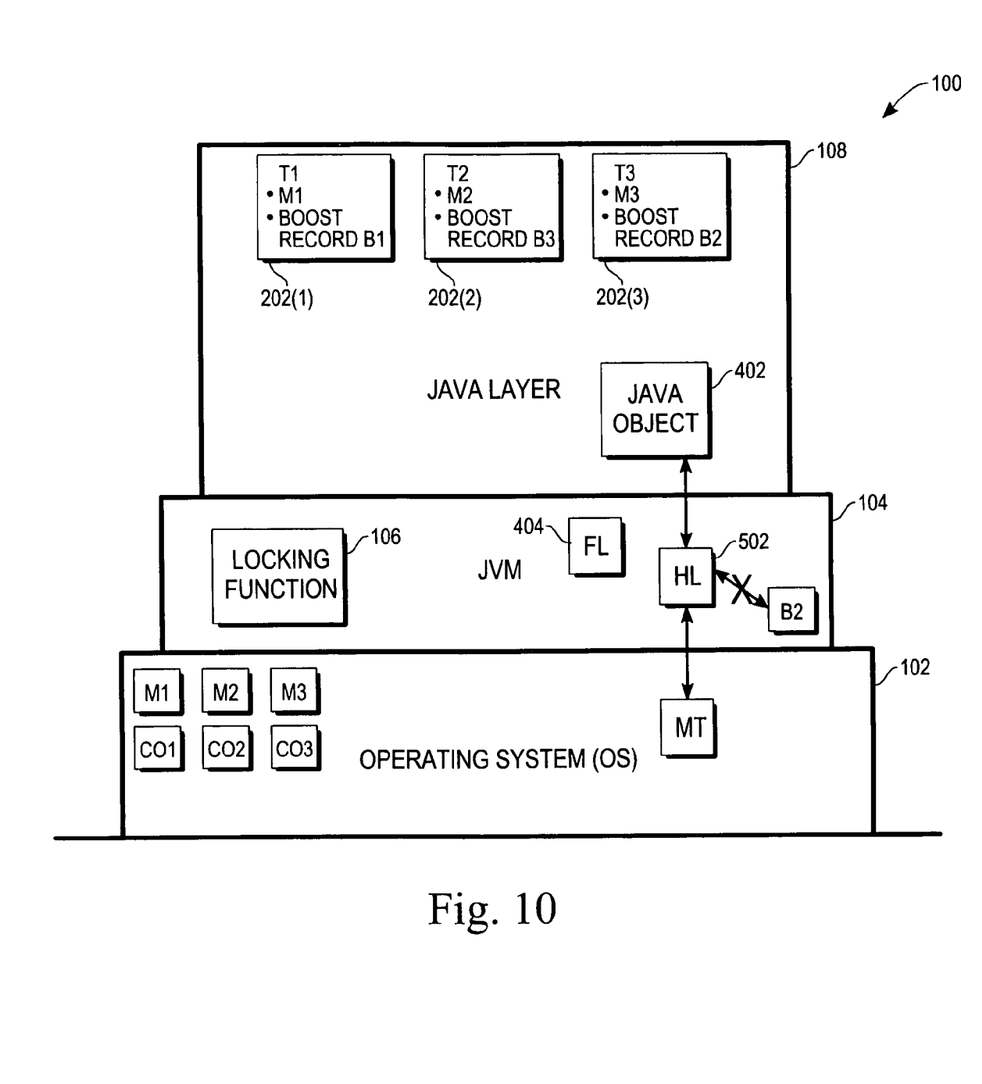

To do so, thread T3 inspects the boost queue in the boost record B2 to determine whether the boost queue still comprises any threads. If it does, then the boost record cannot be reclaimed yet. In such a case, thread T3 will "steal" a boost record from another thread, in the manner described above in connection with thread T2. On the other hand, if the boost queue does not contain any more threads, then it means that no other threads will be referring to the boost record B2. In such a case, the boost record B2 can be reclaimed. In the current example, there are no more threads in the boost queue (recall that thread T3 was previously removed therefrom). Thus, boost record B2 can be reclaimed. To do so, thread T3 updates the HL data structure 502 to remove the pointer to the boost record B2. In addition, thread T3 updates the boost record pointer in its thread data structure 202(3) to point to boost record B2. By doing so, thread T3 disassociates the boost record B2 from the HL data structure 502 and associates the boost record B2 with itself. The result is shown in FIG. 10. Notice that thread T2 and thread T3 have effectively swapped boost records B2 and B3. This is permissible. So long as each thread ends up with an associated boost record, the system will operate properly. After thread T3 obtains a boost record, the boost cancellation process is completed (at least with respect to thread T3). Thereafter, thread T3 proceeds to contend for a lock on the target mutex MT. To do so, thread T3 calls down to the OS 102, and requests a lock on MT. In the current example, thread T2 owns the lock on mutex MT; thus, the OS 102 puts thread T3 back to sleep.

At some point, after having completed execution of the Java application code that requires locking of the object 402, thread T2 will once again invoke, and hence, execute the locking function 106 to release the lock on the target mutex MT. When the lock is released, the OS 102 determines whether there are any threads that are waiting on the target mutex MT. In the current example, thread T3 is waiting on mutex MT. Hence, the OS 102 gives ownership of the lock on mutex MT to thread T3, and wakes thread T3. After thread T3 obtains the lock on mutex MT, and hence, a lock on the object 402, it stops executing the locking function 106 and resumes execution of Java application code. At some point, after having completed execution of the Java application code that requires locking of the object 402, thread T3 will once again invoke, and hence, execute the locking function 106 to release the lock on the target mutex MT. When that occurs (assuming no other threads are waiting on the mutex MT), the locking function 106 moves the mutex MT and the HL data structure 502 to a free list to be used for subsequent locking of the object 402. In the manner described, fast locking is implemented in a priority-correct and low-memory safe fashion.

Hardware Overview

Figure 11:
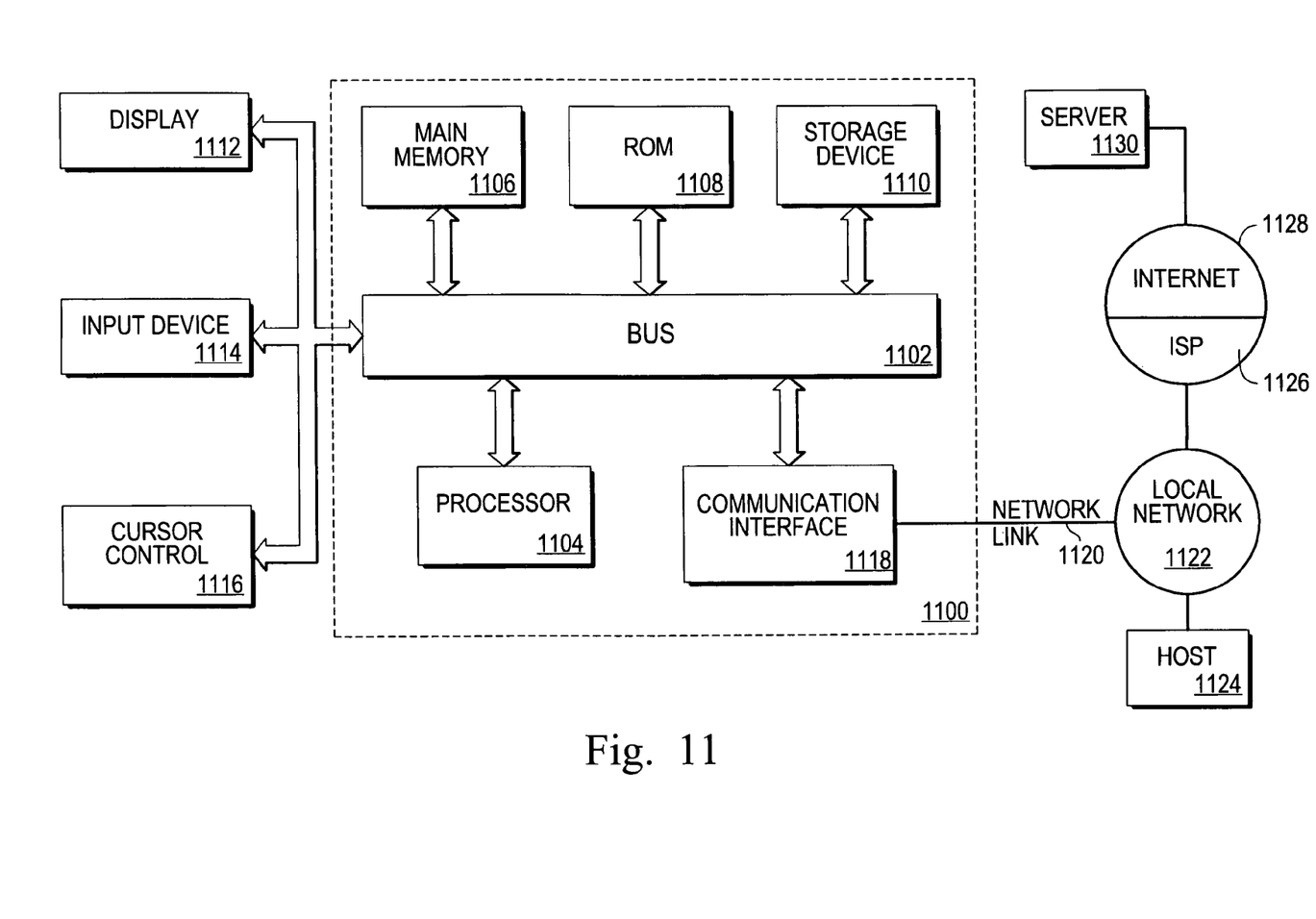
FIG. 11 is a block diagram of a general purpose computer system in which one embodiment of the present invention may be implemented.

In one embodiment, the operating system 102, JVM 104, locking function 106, and java object 402 may take the form of sets of instructions that are executed by one or more processors. If they take the form of sets of instructions, FIG. 11 shows a block diagram of a computer system 1100 upon which these sets of instructions may be executed. Computer system 1100 includes a bus 1102 for facilitating information exchange, and one or more processors 1104 coupled with bus 1102 for processing information. Computer system 1100 also includes a main memory 1106, such as a random access memory (RAM) or other dynamic storage device, coupled to bus 1102 for storing information and instructions to be executed by processor 1104. Main memory 1106 also may be used for storing temporary variables or other intermediate information during execution of instructions by processor 1104. Computer system 1100 may further include a read only memory (ROM) 1108 or other static storage device coupled to bus 1102 for storing static information and instructions for processor 1104. A storage device 1110, such as a magnetic disk or optical disk, is provided and coupled to bus 1102 for storing information and instructions.

Computer system 1100 may be coupled via bus 1102 to a display 1112 for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

In computer system 1100, bus 1102 may be any mechanism and/or medium that enables information, signals, data, etc., to be exchanged between the various components. For example, bus 1102 may be a set of conductors that carries electrical signals. Bus 1102 may also be a wireless medium (e.g. air) that carries wireless signals between one or more of the components. Bus 1102 may further be a network connection that connects one or more of the components. Any mechanism and/or medium that enables information, signals, data, etc., to be exchanged between the various components may be used as bus 1102.

Bus 1102 may also be a combination of these mechanisms/ media. For example, processor 1104 may communicate with storage device 1110 wirelessly. In such a case, the bus 1102, from the standpoint of processor 1104 and storage device 1110, would be a wireless medium, such as air. Further, processor 1104 may communicate with ROM 1108 capacitively. Further, processor 1104 may communicate with main memory 1106 via a network connection. In this case, the bus 1102 would be the network connection. Further, processor 1104 may communicate with display 1112 via a set of conductors. In this instance, the bus 1102 would be the set of conductors. Thus, depending upon how the various components communicate with each other, bus 1102 may take on different forms. Bus 1102, as shown in FIG. 11, functionally represents all of the mechanisms and/or media that enable information, signals, data, etc., to be exchanged between the various components.

The invention is related to the use of computer system 1100 for implementing the techniques described herein. According to one embodiment of the invention, those techniques are performed by computer system 1100 in response to processor 1104 executing one or more sequences of one or more instructions contained in main memory 1106. Such instructions may be read into main memory 1106 from another machine-readable medium, such as storage device 1110. Execution of the sequences of instructions contained in main memory 1106 causes processor 1104 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 1100, various machine-readable media are involved, for example, in providing instructions to processor 1104 for execution. Such a medium may take many forms, including but not limited to, non-volatile media, volatile media, and transmission media. Non-volatile media includes, for example, optical or magnetic disks, such as storage device 1110. Volatile media includes dynamic memory, such as main memory 1106. Transmission media includes coaxial cables, copper wire and fiber optics, including the wires that comprise bus 1102. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, DVD, or any other optical storage medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 1104 for execution. For example, the instructions may initially be carried on a magnetic disk of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are exemplary forms of carrier waves transporting the information.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118.

The received code may be executed by processor 1104 as it is received, and/or stored in storage device 1110, or other non-volatile storage for later execution. In this manner, computer system 1100 may obtain application code in the form of a carrier wave.

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the issued claims and the equivalents thereof.

What is claimed is:

1. A machine implemented method, comprising:
   initializing a first thread, wherein initializing the first thread comprises allocating a first mutex and causing the first thread to obtain a lock on the first mutex, and allocating a first memory portion which is associated with the first thread as a first boost record;
   initializing a second thread, wherein initializing the second thread comprises allocating a second mutex and causing the second thread to obtain a lock on the second mutex, and allocating a second memory portion which is associated with the second thread as a second boost record;
   granting the first thread a lock on a target object;
   detecting that the second thread wishes to lock the target object while the first thread owns the lock on the target object;
   creating a heavy-weight lock (HL) data structure, which is associated with the target object;
   disassociating the second boost record from the second thread and associating the second boost record with the HL data structure;
   updating a boost queue in the second boost record to include the second thread; and
   causing the second thread to wait on the first mutex and a cancel object, wherein the second thread is awakened if either the lock on the first mutex is released or the cancel object is signaled.

2. The method of claim 1, further comprising:
   causing a target mutex to be allocated and associated with the HL data structure, wherein the target mutex is currently not locked by any thread.

3. The method of claim 2, further comprising:
   updating the HL data structure to indicate that a boost condition currently exists.

4. The method of claim 3, further comprising:
   detecting that a boost condition currently exists;
   determining, by the first thread, that it currently owns the lock on the target object;
   obtaining, by the first thread, a lock on the target mutex;

updating the HL data structure to indicate that a boost condition no longer exists; and causing, by the first thread, the cancel object to be signaled.

5. The method of claim 4, wherein the first thread does not release the lock on the first mutex.

6. The method of claim 1, further comprising:

updating, by the second thread after being awakened, the second boost record to remove the second thread from the boost queue;

determining that the second thread currently has no boost record associated therewith;

determining whether the boost queue currently comprises any threads; and in response to a determination that the boost queue does not currently comprise any threads, disassociating the second boost record from the HL data structure and associating the second boost record with the second thread.

7. The method of claim 1, further comprising:

initializing a third thread, wherein initializing the third thread comprises allocating a third mutex and causing the third thread to obtain a lock on the third mutex, and allocating a third memory portion which is associated with the third thread as a third boost record;

detecting that the third thread wishes to lock the target object while the first thread owns the lock on the target object;

updating the boost queue in the second boost record to include the third thread; and causing the third thread to wait on the first mutex and the cancel object, wherein the third thread is awakened if either the lock on the first mutex is released or the cancel object is signaled.

8. The method of claim 7, further comprising:

updating, by the second thread after being awakened, the second boost record to remove the second thread from the boost queue;

determining that the second thread currently has no boost record associated therewith;

determining that the boost queue currently comprises at least the third thread; and disassociating the third boost record from the third thread and associating the third boost record with the second thread.

9. The method of claim 8, further comprising:

updating, by the third thread after being awakened, the second boost record to remove the third thread from the boost queue;

determining that the third thread currently has no boost record associated therewith;

determining whether the boost queue currently comprises any threads; and in response to a determination that the boost queue does not currently comprise any threads, disassociating the second boost record from the HL data structure and associating the second boost record with the third thread.

10. The method of claim 1, wherein the lock on the target object is a fast lock, which is not an operating system level lock.

11. A machine readable storage medium, comprising:

instructions for causing one or more processors to initialize a first thread, wherein initializing the first thread comprises allocating a first mutex and causing the first thread to obtain a lock on the first mutex, and allocating a first memory portion which is associated with the first thread as a first boost record;

instructions for causing one or more processors to initialize a second thread, wherein initializing the second thread comprises allocating a second mutex and causing the second thread to obtain a lock on the second mutex, and allocating a second memory portion which is associated with the second thread as a second boost record;

instructions for causing one or more processors to grant the first thread a lock on a target object;

instructions for causing one or more processors to detect that the second thread wishes to lock the target object while the first thread owns the lock on the target object;

instructions for causing one or more processors to create a heavy-weight lock (HL) data structure, which is associated with the target object;

instructions for causing one or more processors to disassociate the second boost record from the second thread and to associate the second boost record with the HL data structure;

instructions for causing one or more processors to update a boost queue in the second boost record to include the second thread; and instructions for causing one or more processors to cause the second thread to wait on the first mutex and a cancel object, wherein the second thread is awakened if either the lock on the first mutex is released or the cancel object is signaled.

12. The machine readable storage medium of claim 11, further comprising:

instructions for causing one or more processors to cause a target mutex to be allocated and associated with the HL data structure, wherein the target mutex is currently not locked by any thread.

13. The machine readable storage medium of claim 12, further comprising:

instructions for causing one or more processors to update the HL data structure to indicate that a boost condition currently exists.

14. The machine readable storage medium of claim 13, further comprising:

instructions for causing one or more processors to detect that a boost condition currently exists;

instructions for causing one or more processors to determine, by the first thread, that the first thread currently owns the lock on the target object;

instructions for causing one or more processors to obtain, by the first thread, a lock on the target mutex;

instructions for causing one or more processors to update the HL data structure to indicate that a boost condition no longer exists; and instructions for causing one or more processors to cause, by the first thread, the cancel object to be signaled.

15. The machine readable storage medium of claim 14, wherein the first thread does not release the lock on the first mutex.

16. The machine readable storage medium of claim 11, further comprising:

instructions for causing one or more processors to update, by the second thread after being awakened, the second boost record to remove the second thread from the boost queue;

instructions for causing one or more processors to determine that the second thread currently has no boost record associated therewith;

instructions for causing one or more processors to determine whether the boost queue currently comprises any threads; and instructions for causing one or more processors to, in response to a determination that the boost queue does not currently comprise any threads, disassociate the second boost record from the HL data structure and to associate the second boost record with the second thread.

17. The machine readable storage medium of claim 11, further comprising:

instructions for causing one or more processors to initialize a third thread, wherein initializing the third thread comprises allocating a third mutex and causing the third thread to obtain a lock on the third mutex, and allocating a third memory portion which is associated with the third thread as a third boost record;

instructions for causing one or more processors to detect that the third thread wishes to lock the target object while the first thread owns the lock on the target object;

instructions for causing one or more processors to update the boost queue in the second boost record to include the third thread; and instructions for causing one or more processors to cause the third thread to wait on the first mutex and the cancel object, wherein the third thread is awakened if either the lock on the first mutex is released or the cancel object is signaled.

18. The machine readable storage medium of claim 17, further comprising:

instructions for causing one or more processors to update, by the second thread after being awakened, the second boost record to remove the second thread from the boost queue;

instructions for causing one or more processors to determine that the second thread currently has no boost record associated therewith;

instructions for causing one or more processors to determine that the boost queue currently comprises at least the third thread; and instructions for causing one or more processors to disassociate the third boost record from the third thread and associating the third boost record with the second thread.

19. The machine readable storage medium of claim 18, further comprising:

instructions for causing one or more processors to update, by the third thread after being awakened, the second boost record to remove the third thread from the boost queue;

instructions for causing one or more processors to determine that the third thread currently has no boost record associated therewith;

instructions for causing one or more processors to determine whether the boost queue currently comprises any threads; and instructions for causing one or more processors to, in response to a determination that the boost queue does not currently comprise any threads, disassociate the second boost record from the HL data structure and to associate the second boost record with the third thread.

20. The machine readable storage medium of claim 11, wherein the lock on the target object is a fast lock, which is not an operating system level lock.

\* \* \* \* \*